US007404063B2

(12) United States Patent
Berlin

(10) Patent No.: US 7,404,063 B2
(45) Date of Patent: Jul. 22, 2008

(54) RECLAIMING THE PCI MEMORY RANGE WITH MINIMAL MEMORY LOSS IN IA-32 PLATFORMS

(75) Inventor: Kimon Berlin, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 377 days.

(21) Appl. No.: 10/698,681

(22) Filed: Oct. 31, 2003

(65) Prior Publication Data

US 2005/0110794 A1 May 26, 2005

(51) Int. Cl.
*G06F 12/10* (2006.01)
(52) U.S. Cl. ................... 711/202; 345/568; 711/209
(58) Field of Classification Search ............. None
See application file for complete search history.

(56) References Cited

U.S. PATENT DOCUMENTS

| 6,069,638 | A | * | 5/2000 | Porterfield | ........ 345/568 |
| 6,192,455 | B1 | * | 2/2001 | Bogin et al. | ........ 711/154 |
| 6,886,090 | B1 | * | 4/2005 | Campbell | ........ 711/206 |

* cited by examiner

*Primary Examiner*—Gary J Portka

(57) ABSTRACT

A method for configuring resources in IA-32 computers enables the PCI memory address range to be reclaimed with minimal loss of available physical memory. The BIOS establishes a remap window at the top of physical memory. The remap window corresponds to the PCI memory address range. The BIOS reports to the operating system that a portion of the remap window is reserved. The reserved portion corresponds to the AGP aperture within the PCI memory address range. The BIOS reports the remaining regions of the remap window as usable memory. All of the PCI memory range except the AGP aperture is thereby successfully reclaimed for general use.

20 Claims, 2 Drawing Sheets

RECLAIMING THE PCI MEMORY RANGE WITH MINIMAL MEMORY LOSS IN IA-32 PLATFORMS

FIELD OF THE INVENTION

This invention relates generally to computer system programming, and more particularly to techniques for configuring computer system resources on IA-32 platforms.

BACKGROUND

Memory-Mapped IO. IA-32 processors permit applications to access input/output ("IO") ports in either of two ways: through a separate IO address space or through the physical memory address space. The latter approach is commonly referred to as "memory-mapped IO."

Address Space, Chipsets, and the BIOS. Beginning with the introduction of the Pentium Pro, IA-32 processors provide a 36-bit address bus. This enables them to support up to 64 GB of physical memory. Accesses to this address space by the CPU and other devices within a computer are generally handled by several chips commonly known as the "chipset." A chipset provides bus interface, data path, instruction caching and similar functions on the motherboard. System firmware known as the basic input/output system ("BIOS") must configure the chipset at boot time with various information, including information about where main memory is located within the address space.

Chipset Configuration and the AGP Aperture. As a practical matter, the capabilities and requirements of the chipset dictate in large part where main memory can be located. The Intel E7505 chipset, for example, is designed to assume that certain devices will always be mapped into the peripheral component interconnect ("PCI") memory address range— that is, the address range beginning at 4 GB and extending downward far enough to include certain address regions. Specifically, it assumes that the advanced programmable interrupt controller ("APIC") addresses, the hub interface addresses, and any memory-mapped IO addresses will reside in this range. Another range of addresses the chipset assumes to exist in the PCI range is the accelerated graphics port ("AGP") aperture. By way of background, the operating system allocates numerous 4 KB pages in main memory for use by the graphics controller. These allocated pages are normally discontiguous; but the graphics controller needs contiguous memory. So, a translation mechanism is used to create a series of contiguous logical addresses (the AGP aperture) within the PCI address range. These addresses map to the discontiguous pages that are allocated in main memory, wherever those might be.

By way of further background, configuration of the Intel E7505 and similar chipsets requires among other things that the BIOS write appropriate values into the top of lower memory ("TOLM") register and into the DRAM row boundary 7 ("DRB7") register. The TOLM register is designed to contain the maximum address below 4 GB that should be treated as main memory. The DRB7 register is designed to contain the maximum address in the machine that should be treated as main memory. Thus, for machines having less physical memory than 4 GB minus the minimum size required for the PCI memory address range, the TOLM and DRB7 registers will contain the same value. But for machines having more memory than that, the physical memory must be split because the PCI memory address range may not be moved. In such machines, there will be one region of physical memory located below the PCI range, and another region of physical memory located above the PCI range. The TOLM register will indicate the highest address within the first range. The DRB7 register will indicate the highest address within the second range.

Memory Reclaiming. In previous generation chipsets, any physical memory that was overlapped by the logical address space allocated to the PCI range was unusable. But in some workstations, the amount of memory allocated to memory-mapped IO devices could easily exceed 1 GB. An unacceptably large amount of physical memory was rendered unusable in such machines.

Now, chipsets such as the E7505 attempt to provide a capability for "reclaiming" physical memory that is overlapped by the PCI range. In theory, this is done by remapping the physical memory lying within the PCI range to an equivalent-sized logical address range located just above the top of physical memory. During chipset configuration, the bottom and top of a remapped window are defined by values written by the BIOS into a REMAPBASE register and a REMAPLIMIT register, respectively. During normal operation, each incoming logical address is checked to determine whether it falls in the remapped window. If so, then the incoming logical address is remapped to the physical memory starting at the address defined by the TOLM register.

The AGP Aperture Bug. Unfortunately, the memory reclaiming feature of the current E7505 chipset operates erroneously: When a device writes to an address within the remapped window, the write is executed correctly. But when a device reads from an address within the remapped window, the E7505 chipset sometimes returns data from reclaimed physical memory, and other times returns data from a corresponding address within the AGP aperture! Moreover, no warning is given to the consumer of this memory when the error occurs.

The straightforward approach to addressing this problem would be to avoid using the memory reclaiming feature of the E7505 chipset altogether. This approach would ensure that no memory accesses could result in errors. The downside of the straightforward approach, however, is that it results in losing a large range of addresses as unusable memory—a range equal in size to the entire PCI memory address range. As was mentioned above, this range can exceed 1 GB in some workstations.

SUMMARY OF THE INVENTION

A preferred embodiment of the invention includes a method for configuring resources in IA-32 computers. For computers using the E7505 or a similar chipset, the inventive method enables the PCI memory address range to be reclaimed with minimal loss of available physical memory. In one aspect, the method includes: establishing a remap window at the top of physical memory, the remap window corresponding to the PCI memory address range; and reporting to the operating system that a portion of the remap window is reserved, the reserved portion corresponding to the AGP aperture within the PCI memory address range. In a further aspect, the method may include reporting to the operating system that the remainder of the remap window is usable memory.

On one hand, the inventive method configures the computer's resources dangerously: It enables devices in the computer to access the portion of the remap window that corresponds to the AGP aperture. If they should do so, they would encounter erroneous data when reading from that area of the address space. But on the other hand, the inventive method labels the remapped AGP aperture in such a way that it never actually will be accessed. (The area is marked as "reserved," but has no

DETAILED DESCRIPTION OF THE PREFERRED EMBODIMENTS

Figure 1:
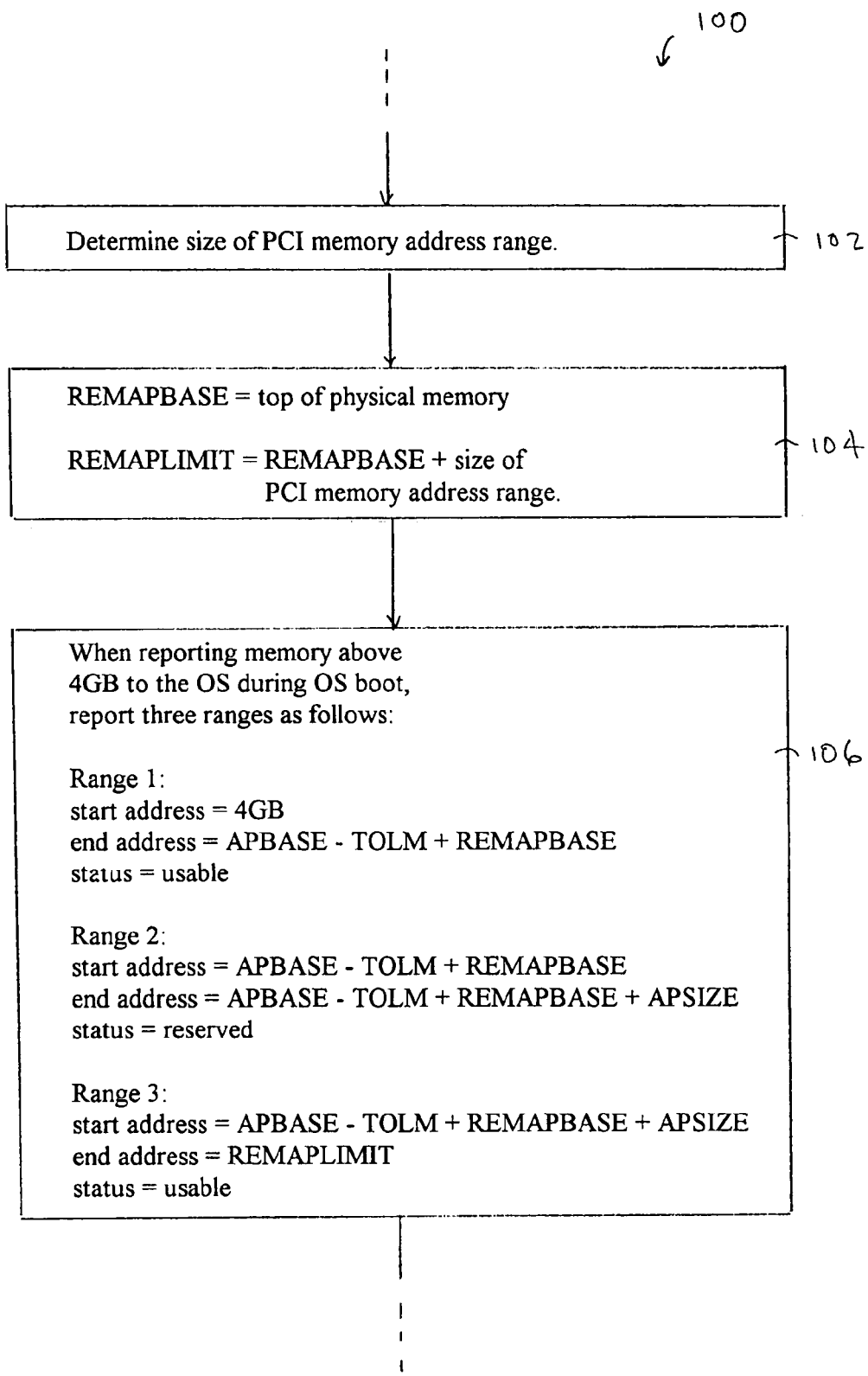
FIG. 1 is a flow diagram illustrating a method for configuring IA-32 computer resources according to a preferred embodiment of the invention.
Figure 2:
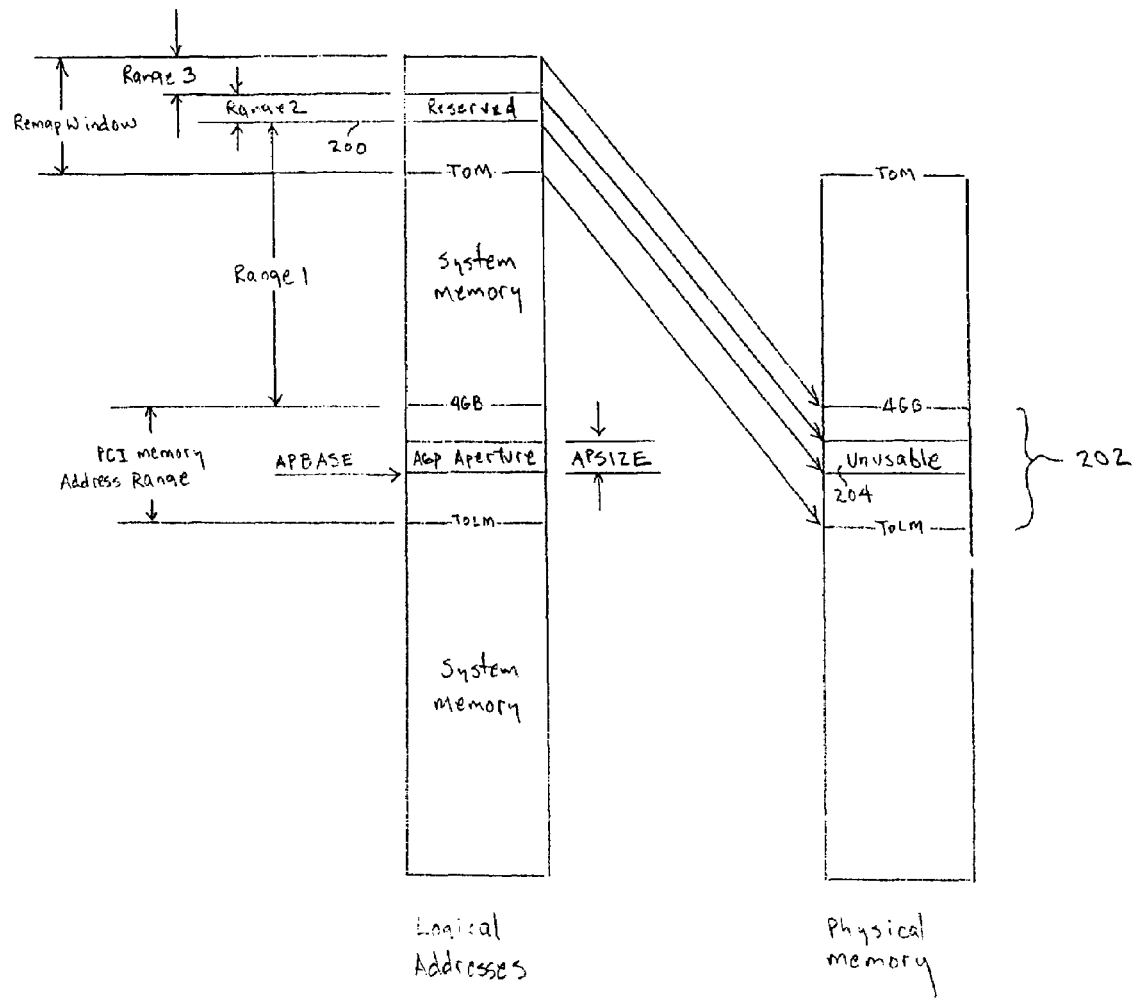
FIG. 2 is a block diagram illustrating the logical address space and physical memory as it would exist after executing the method of FIG. 1.

FIG. 1 illustrates a method 100 for configuring IA-32 computer resources according to a preferred embodiment of the invention. In one embodiment, the method was implemented in the BIOS. In alternative embodiments, the method may be implemented in other firmware or in software or hardware. FIG. 2 illustrates how the logical address space and physical memory will appear after the method of FIG. 1 has been executed. The inventive method will be described in relation to both FIGS. 1 and 2.

In step 102, the BIOS determines the size of the PCI memory address range for the host computer. Normally, this will be the range of addresses between TOLM and 4 GB. In addition, the BIOS should determine the starting address and size of the AGP aperture within the PCI memory address range. This may be accomplished by reading the values in the APBASE and APSIZE registers, respectively.

In step 104, the BIOS establishes a remap window at the top of physical memory, indicated in the drawing as TOM. This may be accomplished by writing the address of the top of physical memory (normally the value in the DRB7 register) into the REMAPBASE register, and writing this value plus the size of the PCI memory address range into the REMAPLIMIT register. Thus, the size of the remap window established will be equal to the size of the PCI memory address range.

The BIOS should also determine a translated AGP aperture address 200. Translated AGP aperture address 200 should be equal to APBASE−TOLM+REMAPBASE.

When the operating system boots, it normally queries the BIOS to determine which regions of the address space are valid for accesses. This may be done using the well-known interrupt 15h function e820h, or by alternative means. As indicated at step 106, the BIOS should report three memory ranges above 4 GB in response to these operating system queries. Range 1 should extend from 4 GB to translated AGP aperture address 200. Range 1 should be reported as usable memory. Range 2 should be equal in size to the AGP aperture (APSIZE), and should begin at translated AGP aperture address 200. Range 2 should be reported as "reserved" memory. Range 3 should begin at the top of range 2 and extend to REMAPLIMIT. Range 3 should be reported as usable memory.

After the memory above 4 GB has been reported to the operating system in this manner, all of the PCI memory address range except the AGP aperture will have been reclaimed, as indicated in the drawing at 202. Any memory accesses directed to a logical address in the remap window will be remapped to a corresponding physical address within reclaimed area 202. The only unusable portion of physical memory remaining in the PCI memory address range will be region 204, which region will have the same size and location as the AGP aperture.

While the invention has been described in detail in relation to preferred embodiments thereof, the described embodiments have been presented by way of example and not by way of limitation. It will be understood by those skilled in the art that various changes may be made in the form and details of the described embodiments, resulting in equivalent embodiments that remain within the scope of the appended claims.

I claim:

1. A method of configuring resources in an IA-32 computer, comprising:
   establishing, by a BIOS, a remap window at the top of physical memory, the remap window corresponding to a PCI memory address range below 4 GB; and
   reporting, in response to a query from an operating system to the BIOS, that a portion of the remap window is reserved, the reserved portion corresponding to an AGP aperture within the PCI memory address range.

2. The method of claim 1, further comprising: reporting to the operating system that the remainder of the remap window is usable memory.

3. A method of configuring resources in an IA-32 computer, comprising:
   setting a REMAPBASE register to the top of physical memory, and a REMAPLIMIT register to the value in the REMAPBASE register plus the size of a PCI memory address range;
   determining a translated AGP aperture address corresponding to the lower end of an AGP aperture minus the address of the top of lower memory plus the value in the REMAPBASE register; and
   in response to queries from an operating system to a BIOS, reporting at least three memory ranges as follows:
      a first usable range beginning at 4 GB and ending at the translated AGP aperture address;
      a reserved range beginning at the top of the first usable range and having a size equal to AGP aperture; and
      a second usable range beginning at the top of the reserved range and ending at the value in the REMAPLIMIT register.

4. A machine-readable storage medium containing code that, when executed on a computer, causes the computer to perform a method of configuring IA-32 computer resources, the method comprising:
   establishing, by a BIOS, a remap window at the top of physical memory, the remap window corresponding to a PCI memory address range below 4 GB; and
   reporting, in response to a query from an operating system to the BIOS, that a portion of the remap window is reserved, the reserved portion corresponding to an AGP aperture within the PCI memory address range.

5. The storage medium of claim 4, wherein the method further comprises:
   reporting to the operating system that the remainder of the remap window is usable memory.

6. A machine-readable storage medium containing code that, when executed on a computer, causes the computer to perform a method of configuring IA-32 computer resources, the method comprising:
   setting a REMAPBASE register to the top of physical memory, and a REMAPLIMIT register to the value in the REMAPBASE register plus the size of a PCI memory address range;
   determining a translated AGP aperture address corresponding to the lower end of an AGP aperture minus the address of the top of lower memory plus the value in the REMAPBASE register; and in response to queries from an operating system to a BIOS, reporting at least three memory ranges as follows:

a first usable range beginning at 4 GB and ending at the translated AGP aperture address;

a reserved range beginning at the top of the first usable range and having a size equal to AGP aperture; and a second usable range beginning at the top of the reserved range and ending at the value in the REMAPLIMIT register.

7. The method of configuring resources in an IA-32 computer as claimed in claim 1, wherein the reporting a portion of the remap window as reserved comprises reporting a portion of the remap window is inaccessible to the operating system.

8. The method of configuring resources in an IA-32 computer as claimed in claim 1, wherein the reporting a portion of the remap window as reserved is performed during operating system boot.

9. The method of configuring resources in an IA-32 computer as claimed in claim 1, further comprising: reclaiming a portion of physical memory corresponding to the PCI memory address range exclusive of the reported reserved portion.

10. The method of configuring resources in an IA-32 computer as claimed in claim 1, wherein the reporting a portion of the remap window as reserved comprises reporting the reserved portion of the remap window is unassigned to an owner.

11. The method of configuring resources in an IA-32 computer as claimed in claim 3, wherein the reporting a reserved range comprises reporting the range beginning at the top of the first usable range and having a size equal to the AGP aperture comprises reporting the reserved range is inaccessible to the operating system.

12. The method of configuring resources in an IA-32 computer as claimed in claim 3, wherein the reporting a reserved range is performed during the operating system boot.

13. The method of configuring resources in an IA-32 computer as claimed in claim 3, further comprising:
reclaiming a portion of physical memory corresponding to the first usable range and the second usable range.

14. The method of configuring resources in an IA-32 computer as claimed in claim 13, wherein the reclaiming is exclusive of the reserved range.

15. The method of configuring resources in an IA-32 computer as claimed in claim 3, wherein the reporting a reserved range comprises reporting the reserved range is unassigned to an owner.

16. The medium as claimed in claim 4, wherein the reporting a portion of the remap window as reserved comprises reporting a portion of the remap window is inaccessible to the operating system.

17. The medium as claimed in claim 4, wherein the reporting a portion of the remap window as reserved is performed during operating system boot.

18. The medium as claimed in claim 4, further comprising:
reclaiming a portion of physical memory corresponding to the PCI memory address range exclusive of the reported reserved portion.

19. The medium as claimed in claim 4, wherein the reporting a portion of the remap window as reserved comprises reporting the reserved portion of the remap window is unassigned to an owner.

20. The medium as claimed in claim 6, wherein the reporting a reserved range comprises reporting the range beginning at the top of the first usable range and having a size equal to the AGP aperture comprises reporting the reserved range is inaccessible to the operating system.

* * * * *